US006888989B1

(12) United States Patent
Zhou et al.

(10) Patent No.: US 6,888,989 B1
(45) Date of Patent: May 3, 2005

(54) PHOTONIC CHIP MOUNTING IN A RECESS FOR WAVEGUIDE ALIGNMENT AND CONNECTION

(75) Inventors: Yan Zhou, Pleasanton, CA (US); Seng-Tiong Ho, Wheeling, CA (US)

(73) Assignee: Phosistor Technologies, Inc., Wheeling, IL (US)

( * ) Notice: Subject to any disclaimer, the term of this patent is extended or adjusted under 35 U.S.C. 154(b) by 0 days.

(21) Appl. No.: 10/310,604

(22) Filed: Dec. 4, 2002

Related U.S. Application Data
(60) Provisional application No. 60/339,131, filed on Dec. 11, 2001.

(51) Int. Cl.[7] .................................................. G02B 6/26
(52) U.S. Cl. .............................. 385/50; 385/14; 385/49; 385/131; 372/50
(58) Field of Search .............................. 385/14, 49–52, 385/65, 83, 129–132; 372/20, 50

(56) References Cited

U.S. PATENT DOCUMENTS

| | | | |
|---|---|---|---|
| 4,466,696 A | 8/1984 | Carney | 385/49 |
| 5,259,049 A | 11/1993 | Bona et al. | 385/50 |
| 5,337,398 A | 8/1994 | Benzoni et al. | 385/90 |
| 5,444,805 A | 8/1995 | Mayer | 385/49 |
| 5,881,190 A | 3/1999 | Harpin et al. | 385/88 |
| 5,907,649 A | 5/1999 | Acklin et al. | 385/49 |
| 5,937,124 A | 8/1999 | Roff | 385/88 |
| 6,112,001 A | 8/2000 | Kishida et al. | 385/49 |
| 6,151,430 A * | 11/2000 | Traver et al. | 385/14 |
| 6,324,323 B1 * | 11/2001 | Benham et al. | 385/49 |

OTHER PUBLICATIONS

Boyd, et al., "Optical Coupling from Fibers to Channel Waveguides Formed on Silicon," *Applied Optics,* vol. 17, No. 6, Optical Society of America, pp. 895–898, (Mar. 15, 1978).

Choi, et al., "Self-Aligning Silicon Groove Technology Platform for the Low Cost Optical Module," *Electronic Components and Technology Conference,* pp. 1140–1144, (1999).

\* cited by examiner

*Primary Examiner*—Phan T. H. Palmer
(74) *Attorney, Agent, or Firm*—Brinks Hofer Gilson & Lione

(57) ABSTRACT

A coupling system for photonic integrated circuits and integrated optical waveguides is provided. A recess is formed in a substrate on which one or more integrated optical waveguides are disposed, the recess being located at the desired mounting location of the photonic integrated circuit. At least one end wall of the recess is inclined with respect to a normal to the substrate surface. At least one end face of a photonic integrated circuit is inclined to match the inclined end wall of the recess. The length, width, and depth of the recess are controlled so that inserting the photonic integrated circuit into the recess passively provides both lateral and vertical alignment of the photonic integrated circuit with the integrated optical waveguide(s).

12 Claims, 9 Drawing Sheets

PHOTONIC CHIP MOUNTING IN A RECESS FOR WAVEGUIDE ALIGNMENT AND CONNECTION

CROSS-REFERENCES TO RELATED APPLICATIONS

This application claims the benefit of U.S. Provisional Application No. 60/339,131, filed Dec. 11, 2001, entitled "Photonic Chip Mounting in a Recess for Waveguide Alignment and Connection," which disclosure is incorporated herein by reference for all purposes.

This application is related to commonly assigned co-pending U.S. patent application Ser. No. 10/083,674, entitled "Integrated Planar Composite Coupling Structures for Bi-directional Light Beam Transformation between a Small Mode Size Waveguide and a Large Mode Size Waveguide," filed Oct. 19, 2001, the disclosure of which is hereby incorporated by reference for all purposes.

This application is also related to commonly assigned co-pending U.S. patent application Ser. No. 60/339,135, entitled "Connection Between a Waveguide Array and a Fiber Array," filed concurrently herewith, the disclosure of which is hereby incorporated by reference for all purposes.

BACKGROUND OF THE INVENTION

The present invention relates generally to fiber optic communications and in particular, to systems and methods for coupling photonic integrated circuits with integrated optical waveguides.

As optical fiber communication advances to handling larger bandwidth, optical or photonic integrated circuits (chips) with multiple input/output ports are expected to replace many of the discrete optical components that are currently interconnected using optical fibers to provide complex optical systems. Because the propagating light mode in a single-mode optical fiber is generally much larger than the beam size in a single-mode channel waveguide made from a semiconductor material such as silicon (Si) or compound semiconductors (e.g., AlGaAs, InGaAsP), it is necessary to transform the beam size between a fiber and an integrated semiconductor optical waveguide. Moreover, for maximally efficient coupling, the mode must be transformed from a circular shape in the fiber to an elliptical shape in the semiconductor waveguide. One existing technique for achieving relatively efficient beam size transformation is to place one or more discrete optical elements such as a micro-lens between the end faces of the fiber and the integrated optical waveguide. Obviously, this approach will not be cost-effective when the semiconductor based photonic chip has a large number of ports (e.g., more than 16).

An alternative is to fabricate an array of beam-size transformers together with an array of optical-fiber-positioning grooves (which typically have either a V-shaped or U-shaped cross section and will be referred to herein as V-grooves) on a single substrate using photolithography-based planar mass production means. Examples of such techniques are described in the above cross-referenced U.S. patent applications entitled "Integrated Planar Composite Coupling Structures for Bi-directional Light Beam Transformation between a Small Size Waveguide and a Large Size Waveguide" and "Connection Between A Waveguide Array And A Fiber Array." This approach considerably reduces the difficulty of aligning and coupling the light path at the large-beam end of a beam-size transformer array with an optical fiber array.

At the small-beam-size end of the beam-size transformer, the light path must be aligned and coupled with the small-size channel waveguide of a photonic integrated circuit. In theory, the photonic integrated circuits could be fabricated together with the beam-size transformers and fiber-positioning V-grooves on the same substrate, thereby providing inherent alignment and connection. In practice, however, indium phosphide-based compound semiconductor (InGaAsP) is the only known usable material for fabricating active photonic circuits that provide light emission and detection at the most commonly used telecommunication wavelength band (about 1.3 $\mu$m to about 1.65 $\mu$m). Because indium-phosphide based materials are expensive and difficult to work with, single-substrate fabrication strategies are not practical for mass-production applications.

A more cost-effective approach takes advantage of the low-cost, well developed processing technologies for glass or silicon devices. Photonic integrated circuits (which are typically small) are fabricated on indium phosphide, while beam size transformers and fiber positioning V-grooves (which typically require a much larger surface) are fabricated together on a glass and/or silicon substrate. In such a system, the small-beam-size ports of the beam-size transformers must be aligned with the small channel waveguides of an InGaAsP-based photonic chip in order to provide efficient transmission of light. Various alignment systems have been used depending on the shape of the respective end faces of the photonic chip and the beam-size transformer.

For certain types of photonic devices, vertical end facets are desirable, e.g., semiconductor lasers (in which vertical end facets act as partially reflective mirrors to provide feedback for the laser cavity). Vertical end facets are easily created by cleaving the crystalline photonic substrate along its vertical crystal plane. Such devices are traditionally coupled to a fiber using discrete optical beam transforming components, e.g., a ball lens, to accomplish the beam-size and shape transformations.

To align photonic chips having vertical end facets with beam-size transformers and optical fibers, a recess may be dry-etched in the glass and/or silicon substrate on which the beam-size transformers and fiber-positioning V-grooves are formed or mounted, the size and depth of the recess being selected to provide alignment between the beam-size transformers and a photonic chip mounted in the recess. For example, Harpin et al., "Assembly of an optical component and an optical waveguide," U.S. Pat. No. 5,881,190, issued Mar. 9, 1999, teaches that a recess may be formed on a SIMOX (Separation by IMplanted Oxygen) based silicon-on-insulator (SOI) substrate and used to mount and align a laser diode with a weakly guiding channel waveguide made on the same SOI substrate. Dry-etching of the recess provides vertical end walls matching the end facets of the photonic chip.

This method provides an alignment accuracy in the lateral and longitudinal directions determined by the limitations of photolithography (which has a feature size or position accuracy limit of about 0.5 microns), while vertical alignment is achieved by using a natural etch stop at the interface between silicon and $SiO_2$ in the SOI wafer (which has a position accuracy limit of about 0.01 microns). The larger inaccuracy in the lateral direction is tolerable because for a III–V compound semiconductor-based channel waveguide, the guided beam mode is elliptical in shape. In general, the lateral beam size of a single-mode semiconductor waveguide is about two to three times the vertical beam size. For example, a weakly guided mode is typically about 5 $\mu$m wide by 2 $\mu$m high, and a strongly guided mode is about 1 $\mu$m wide by 0.4 $\mu$m high. Hence, the required precision of vertical alignment is higher than for lateral alignment.

But the recess technology has a number of limitations. For instance, the cleaving process cannot produce a photonic chip with a size controlled to submicron precision because of the relatively large size (typically a few microns) of the diamond tip that initiates the cleaving and the limited positioning precision (about 5 microns) of existing cleaving machinery. Further, existing automatic chip placement machinery offers a placement position accuracy of about 5 microns. Consequently, in order to allow for size variations in the cleaved photonic chips and to prevent mechanical damage to the photonic chip when it is placed into the recess, the recess must be made larger than the photonic chip by at least 10 microns. The photonic chip is then aligned with the channel waveguide by pushing the chip to one corner of the recess.

Thus, the method is limited to a photonic chip having only one output (or input) port on one side that must be connected and aligned with one channel waveguide. For photonic chips having input and output ports on both sides of the chip, as future applications will require, these designs are inadequate, in part because pushing a chip that is smaller (e.g., by 10 $\mu$m) than the recess to one end of the recess will always leave a gap (of 10 $\mu$m) at the opposite end, leading to unacceptable light loss at the opposite end.

Moreover, this method docs not address the need to flexibly control the depth of the recess to accommodate photonic chips of different waveguide dimensions. For example, Harpin discloses as a substrate a standard SIMOX-based SOI wafer in which the thickness of the buried insulating $SiO_2$ layer has a standard value of approximately 0.4 $\mu$m. This insulating layer provides a natural etch stop, thereby defining the depth of the etched recess. If this standard thickness is not suitable for a particular configuration of photonic chip and integrated waveguide, then the technique of Harpin cannot be used.

For other types of photonic devices, such as amplifiers and modulators, vertical end facets are not desirable; end facets of these devices are typically made to have a small inclination angle (typically 8° or 9°) in the lateral plane so that reflected light does not couple back into the device. When the mounting recess has a vertical end wall, the coupling of the light path between the photonic device and the channel waveguide is not efficient.

Another design has been proposed for use with optical transceivers in which at least two single-function, single-port photonic chips, e.g., a laser diode and a photodiode, are mounted in trapezoidal U-grooves or wells wet-etched in silicon for coupling to an optical fiber. A layer of solder material in the bottom of the U-groove holds the chips in place. V-grooves in the silicon are used to position the optical fiber. Optionally, a micro-lens may be provided between the photonic chips and the optical fiber for beam-size transformation, or the optical fiber may simply be placed against the end face of the photonic chip. [E.g., M. H. Choi et. al., "Self-Aligning Silicon Groove Technology Platform for the Low Cost Optical Module," 49$^{th}$ Electronic Components and Technology Conference, Jun. 2–4, 1999, San Diego, Calif., USA].

This approach also has limitations. Notably, because the fiber end face is vertical and flat, the end face of the channel waveguide must likewise be vertical and flat. Further, vertical alignment is provided by controlling the thickness of the solder material, which is imprecise. As a result, this arrangement provides precise alignment of the photonic chip and channel waveguide only in the lateral direction (transverse to the light propagation axis), not in the vertical direction.

An improved coupling system for photonic chips and integrated waveguides, suitable for use with multiport photonic chips, is therefore needed.

BRIEF SUMMARY OF THE INVENTION

The present invention provides an improved coupling system for coupling photonic integrated circuits with integrated optical waveguides, together with fabrication techniques for the coupling. The present invention may be used with single-port photonic integrated circuits coupled to single integrated optical waveguides or with multiport photonic integrated circuits coupled to an array of integrated optical waveguides.

According to one aspect of the present invention, a device is provided for mounting and aligning a single-port or multiport photonic integrated circuit with one or more integrated optical waveguides. The device comprises a substrate on which one or more integrated optical waveguides are fabricated or mounted. A recess is formed in the substrate at the desired mounting location of the photonic integrated circuit. The recess has at least one end wall that is inclined with respect to a normal to the substrate surface. A photonic integrated circuit has at least one end face that is inclined to match the inclined end wall of the recess. The length and width of the recess are controlled so that inserting the photonic integrated circuit into the recess passively provides lateral alignment of the photonic integrated circuit with the integrated optical waveguide(s). The depth of the recess is also controlled so that inserting the photonic integrated circuit into the recess passively provides vertical alignment of the photonic integrated circuit with the integrated optical waveguide(s). The inclined end wall of the recess and the inclined end face of the photonic integrated circuit serve to guide the photonic integrated circuit into position during mounting.

According to a further aspect of the present invention, a plurality of pillars may be provided on the floor of the recess, each of the pillars having inclined side faces, and a corresponding plurality of indentations in the bottom surface of the photonic integrated circuit, each of the indentations having inclined side walls. The respective dimensions of the pillars and indentations are chosen so that during mounting, each pillar interlocks with an indentation, thereby providing further alignment and self-guided docking for the photonic integrated circuit in the recess.

According to another aspect of the present invention, the substrate may comprise a silicon-on-insulator wafer, or a silica-on-silicon wafer.

According to yet another aspect of the present invention, a method is provided for mounting a photonic integrated circuit in alignment with one or more integrated optical waveguides fabricated on a substrate. At least one end face of the photonic integrated circuit is shaped to have an inclination angle with respect to a vertical direction. A recess is formed in the substrate, the recess having at least one end wall with an inclination angle with respect to the vertical direction that is substantially equal to the end-face inclination angle of the photonic circuit. As the recess is formed, the depth, length, and width of the recess are controlled so that mounting the photonic integrated circuit in the recess vertically and laterally aligns the photonic integrated circuit with the one or more integrated optical waveguides.

According to yet another aspect of the present invention, the recess may be formed by applying a photoresist layer to the substrate, then applying a grayscale mask pattern over the photoresist layer, the grayscale mask pattern configured to produce a recess with an inclined end wall. Photolithography then produces a photoresist pattern that is vertically tapered in a region corresponding to the desired location of the inclined end wall, and dry etching transfers the vertically tapered photoresist pattern to the substrate, thereby producing the inclined end wall.

According to still another aspect of the present invention, in embodiments where the photonic integrated circuit comprises a crystalline semiconductor material, the inclined end face may be created by wet-etching of the crystalline semiconductor material. Similarly, in embodiments where the substrate comprises a crystalline semiconductor material, the recess in the substrate may be created by wet etching the crystalline semiconductor material.

According to a further aspect of the present invention, pillars may be formed on the floor of the recess during the formation of the recess, and corresponding indentations may be formed on the mounting surface of the photonic integrated circuit. During mounting, each pillar is aligned with the corresponding indentation.

According to a still further aspect of the present invention, when the substrate comprises a silicon wafer, recess depth may be controlled by forming insulating layers within the silicon, the insulating layers having different depths in different areas of the wafer. In some embodiments, implantation of oxygen ions using a patterned retardation mask layer may be used; the patterned retardation mask layer causes implanted oxygen ions to penetrate to approximately a first depth in the region of the wafer where the recess is to be formed and to approximately a second depth less deep than the first depth in another region of the wafer. The wafer is then thermally annealed to create a first partial insulating (silicon dioxide) layer at approximately the first depth and a second partial insulating layer at approximately the second depth. The second partial insulating layer is then used as a natural etch stop to establish the floor, and therefore the depth, of the recess.

According to another aspect of the present invention, the depth of the recess may be controlled by using as the substrate a silicon-on-insulator (SOI) wafer. The thickness of the insulating layer and the top silicon layer may be controlled through wafer bonding. The interface between the insulating layer and the bottom silicon layer may be used as a natural etch stop to establish the floor, and therefore the depth, of the recess.

According to yet another aspect of the present invention, the depth of the recess may be controlled by using as the substrate a silica-on-silicon (SOS) wafer. The thickness of the top silica layer may be controlled through wafer bonding. The interface between the insulating layer and the bottom silicon layer may be used as a natural etch stop to establish the floor, and therefore the depth, of the recess.

The following detailed description together with the accompanying drawings will provide a better understanding of the nature and advantages of the present invention.

DETAILED DESCRIPTION OF THE INVENTION

Figure 1:
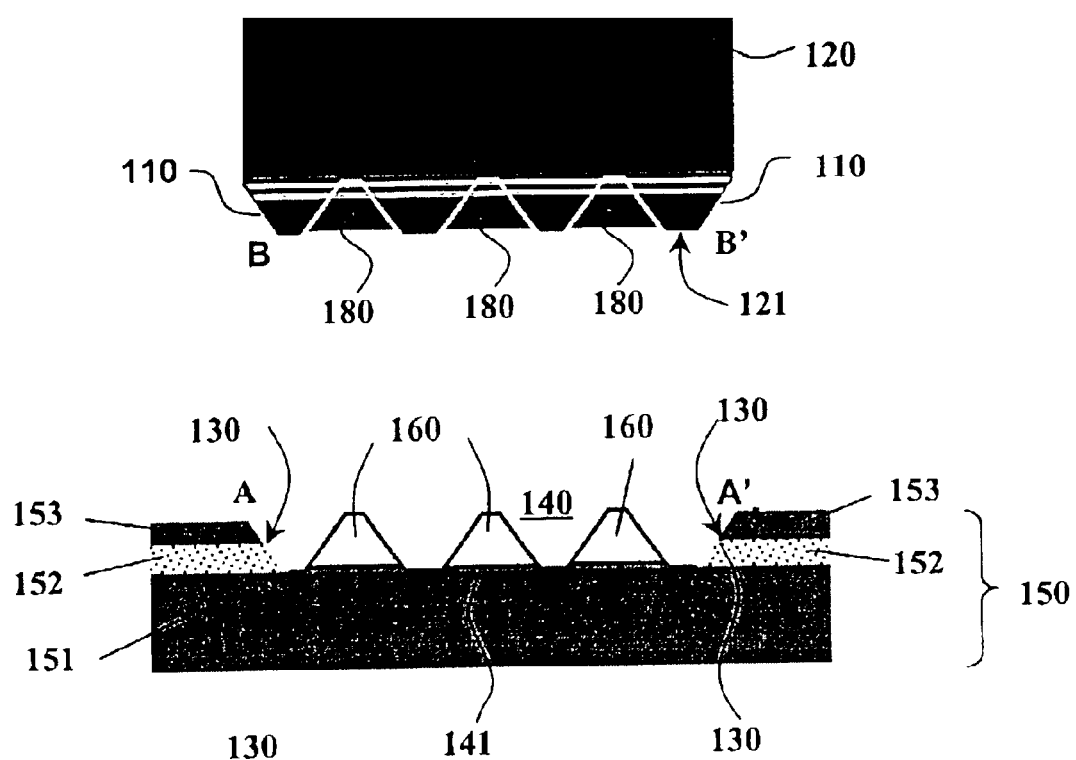
FIG. 1 is a cross-sectional view of an embodiment of a mounting recess for a photonic chip according to the present invention.

FIG. 1 is a cross-sectional view of an exemplary embodiment of a photonic chip mounting arrangement according to the present invention. Recess 140 is formed in top layer 153 and insulating ($SiO_2$) layer 152 of silicon-on-insulator (SOI) or silica-on-silicon (SOS) substrate 150. End walls 130 of recess 140 have a nonzero (preferably greater than 10°) inclination angle with respect to vertical; the specific choice of inclination angle will be discussed in more detail below. In some embodiments, all side walls of recess 140 have similarly inclined surfaces, although this is not required. Recess 140 has a substantially flat bottom surface 141. In one embodiment, bottom surface 141 has a surface area of about 300 $\mu$m by 300 $\mu$m. In one preferred embodiment, a number of pillars 160 (which may be anywhere from 2 to 50 $\mu$m tall) are formed on bottom surface 141, each pillar having inclined side faces. Preferably, three pillars 160 in a triangular arrangement are used, but the number and placement of pillars may be varied. Conducting paths and pads (not shown) are preferably fabricated on bottom surface 141 for electrical connection with a photonic chip.

One or more integrated optical waveguides are fabricated in top layer 153, which comprises silicon when the substrate is an SOI wafer, or doped silica or glass when the substrate is an SOS wafer. The integrated optical waveguides may include any optical waveguiding and/or beam-reshaping structure, including a micro-optic structure such as a micro-optical lens, mirror, or diffractive element. The waveguides may also include a combined waveguiding and beam transformation structure, such as a coupler of the type described in the above-cross-referenced co-pending U.S. Patent application entitled "Integrated Planar Composite Coupling Structures for Bi-directional Light Transformation between a Small Mode Size Waveguide and a Large Mode Size Waveguide." The integrated optical waveguides may be fabricated using any suitable methods and materials, including but not limited to glass, semiconductors, polymers, optical crystals, or other dielectric materials. Fabrication of the waveguides in top layer 153 may be done before, after, or concurrently with formation of recess 140.

A photonic integrated circuit (chip) 120 has inclined end faces 110, the inclination angle of which is approximately equal to the inclination of the end walls 130 of recess 140. Again, in some embodiments, all side faces of photonic chip 120 have similarly inclined surfaces, although this is not required. The dimensions of bottom surface 121 of photonic chip 120 are substantially equal to the corresponding dimensions of the bottom surface 141 of recess 140. In one preferred embodiment, a number of indentations 180 (typically about 1 to 10 $\mu$m deep) having inclined end walls are formed in bottom surface 121 of photonic chip 120; each indentation aligns with a corresponding pillar 160 on bottom surface 141 of recess 140 so that the top of each pillar 160 fits into one of indentations 180.

As photonic chip 120 is placed into in recess 140, the respective inclination angles of chip end faces 110 and recess end walls 130 provide automatic lateral alignment between the waveguiding region of photonic chip 120 and the integrated optical waveguides fabricated in layer 153. The depth of recess 140 is also controlled to provide vertical alignment between the waveguiding region of photonic chip 120 and the integrated optical waveguides fabricated in layer 153 and, if desired, to leave enough space for electrical connection materials.

One preferred embodiment, where pillars 160 and indentations 180 are present, provides an enhanced docking mechanism. The interlocking of pillars 160 and indentations 180 helps to guide photonic chip 120 into position while protecting end faces 110 from mechanical damage. In some embodiments, pillars 160 are made higher than indentation 180 so that bottom surface 121 of photonic chip 120 does not contact bottom surface 141 of recess 140. In such an embodiment, electrical connection materials, such as solder materials or silvered epoxy, are placed in the space between surfaces 121 and 141 to fix photonic chip 120 into position and to provide electrical connections for photonic chip 120. In embodiments where the bottom surface of chip 110 or recess 140 contains irregularities, use of pillars 160 and indentations 180 also improves the alignment of photonic chip 120 with waveguides fabricated in silicon or glass layer 153. It will be appreciated that similar docking and alignment functionality may alternatively be provided by indentations in recess 140 and matching pillars on the bottom surface of chip 110, and that the number and placement of pillars and corresponding indentations may be varied.

Exemplary processes for forming vertically inclined walls in a recess and in a photonic chip will now be described. One skilled in the art will recognize that these processes are examples; other processes may also be used.

Figure 2A:
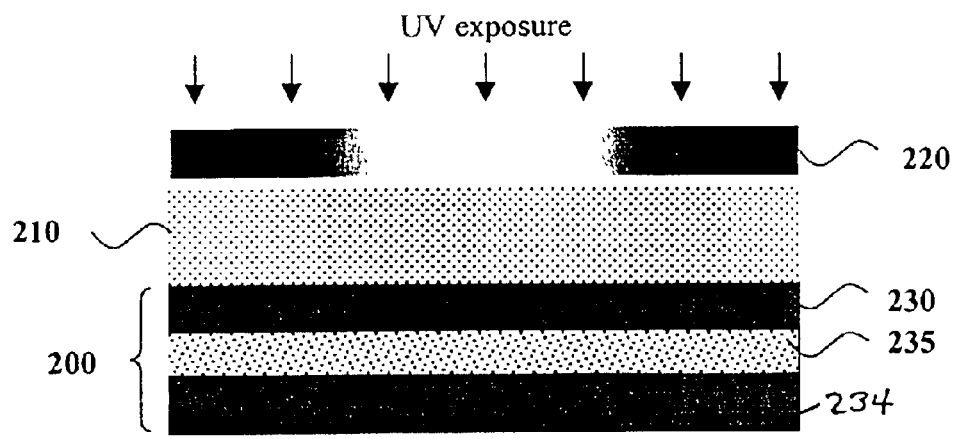
FIGS. 2A–C are cross-sectional views showing steps in the fabrication of a recess in a substrate.
Figure 2B:
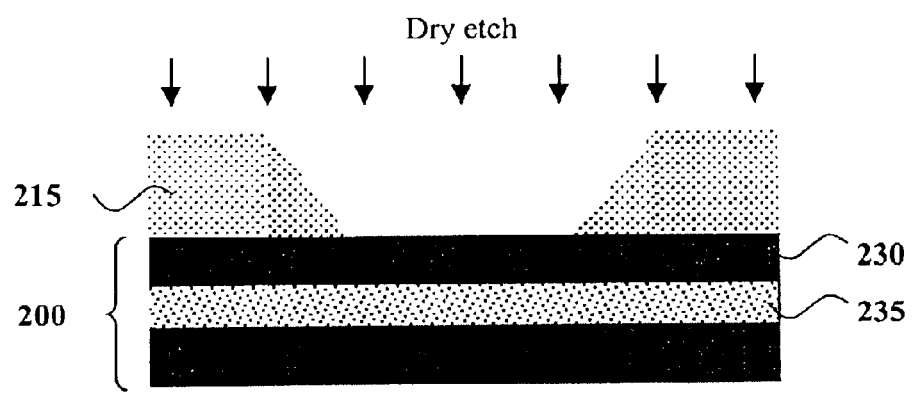
Figure 2C:
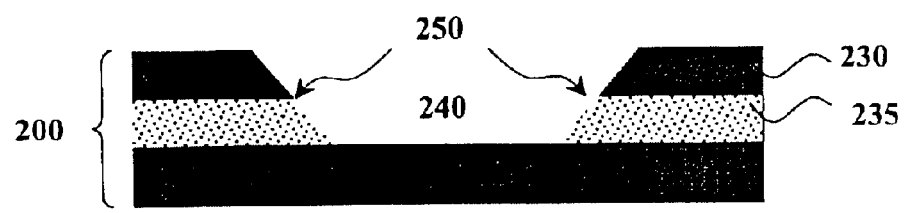

FIGS. 2A–C illustrate a dry etching process for forming a recess with vertically inclined walls in a silicon-based substrate. FIG. 2A shows a substrate 200, which may be an SOI or SOS substrate. Substrate 200 includes a bottom silicon layer 234, an insulating ($SiO_2$) layer 235, and a top layer 230. Top layer 230 may be either a silicon layer of an SOI wafer or glass waveguide layer on an SOS wafer, the glass waveguide layer having a higher refractive index than insulating layer 235. A photoresist layer 210 is applied to top layer 230, e.g., by spin-coating. A grayscale mask 220 is then introduced. Grayscale mask 220 is designed to have a low-density area (shown as a light gray area) in the central recess region, progressively increasing-density areas at the end walls, and a high-density area (shown as a dark area) outside the recess. Photolithography with ultraviolet (UV) exposure causes a portion of photoresist layer 230 to be removed in inverse proportion to the density of grayscale mask 220. Thus, photolithography using grayscale mask 220 produces a vertically tapered photoresist pattern 215, shown in FIG. 2B. A dry etching process (indicated by arrows) transfers tapered photoresist pattern 215 to top layer 230 and insulating ($SiO_2$) layer 235, as shown in FIG. 2C. This creates a recess region 240 with vertically inclined (or tapered) side walls 250. In one preferred embodiment, the grayscale mask is designed so that pillars within the area of the recess are also formed via dry etching. This may be done, for instance, by configuring grayscale mask 220 to provide additional protected (high-density) or partially protected regions within the recess area. Additional details regarding the use of grayscale masks in photolithography and etching of vertically tapered walls are provided in the above cross-referenced patent application entitled "Integrated Planar Composite Coupling Structures for Bi-directional Light Beam Transformation between a Small Mode Size Waveguide and a Large Mode Size Waveguide."

If desired, openings or trenches for conducting paths and/or pads are then formed, for instance by using well-known dry etching techniques. Conducting paths and/or pads are then formed by depositing metal film into these openings or trenches, e.g., by evaporation, sputtering or other known processes. This step may be followed by electroplating to increase the thickness of the metal films.

Figure 3A:
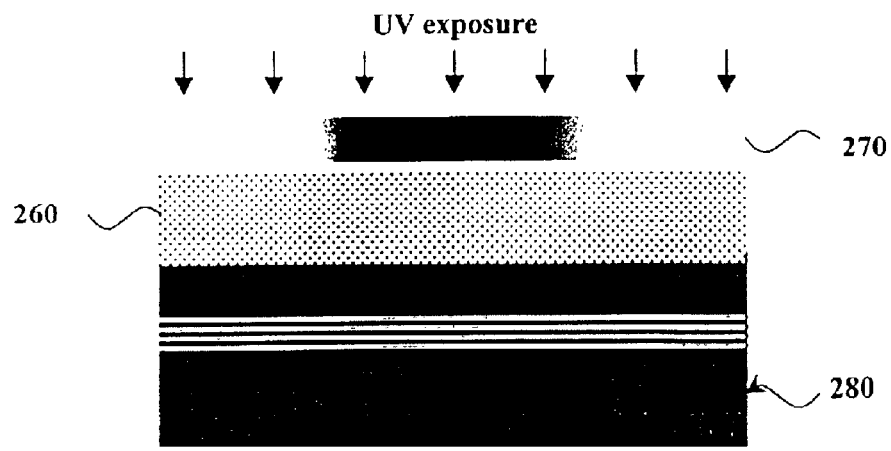
FIGS. 3A–C are cross-sectional views showing steps in the fabrication of inclined end faces for a photonic chip.
Figure 3B:
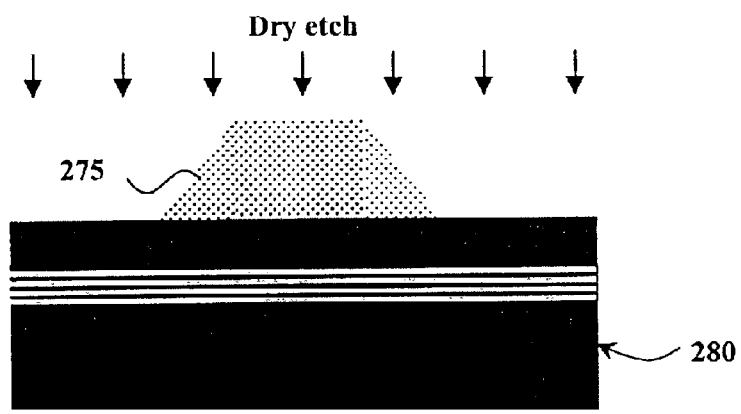
Figure 3C:
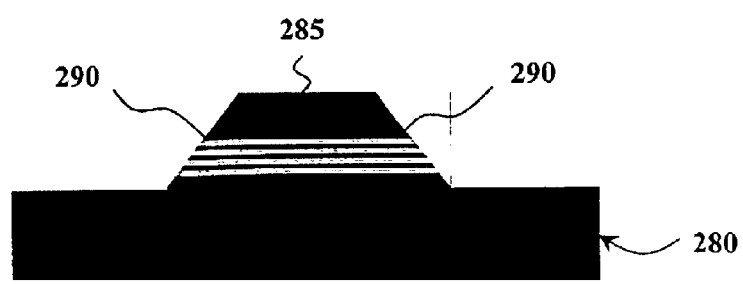

FIGS. 3A–C illustrate a dry etching process for forming inclined end faces on a photonic chip. As shown in FIG. 3A, a photoresist layer 260 is applied to the surface of a photonic chip 280, e.g., by spin-coating. A grayscale mask 270 is then used in photolithography to form vertically tapered photoresist pattern 275, shown in FIG. 3B. A dry etching process (indicated by arrows) transfers tapered photoresist pattern 275 to photonic chip 280. This process defines a photonic chip mounting surface 285 and vertically inclined (or tapered) end faces 290. The width of surface 285 is chosen so that when photonic chip 280 is mounted on a substrate, such as substrate 200 (shown in FIG. 2C), surface 285 fits into recess 240, and chip end faces 290 align with recess end walls 250. In one preferred embodiment, the grayscale mask 270 is designed so that indentations in the bottom surface of the photonic chip are also formed via dry etching. This may be done, for instance, by providing additional exposed or partly exposed areas on the grayscale mask.

An alternative approach uses wet etching rather than dry etching to provide nearly equal inclination angles for the photonic chip and recess at lower cost and complexity. It is well known in the art that Si-, GaAs- and InP-based semiconductors all have crystal planes of different orientations and that highly selective wet etching techniques are capable of revealing these crystal planes, resulting in the formation of angled walls (such as V-grooves) in these semiconductors. The inclination angle of a V-groove side wall with respect to the vertical direction depends on the crystalline structure. For the most commonly used (100) orientation semiconductors, the angles are similar: 35.25° for Si, 35° for GaAs, and 32.5° for InP. The disadvantage of wet etching is that the respective inclination angles of the photonic chip end faces and recess side walls will not be exactly equal if different semiconductors are used, e.g., if the recess is formed in a silicon wafer for mounting an InP-based photonic chip. In view of the lower cost of wet etching, however, the differences in inclination angles are small enough to be acceptable for many applications.

Figure 4A:
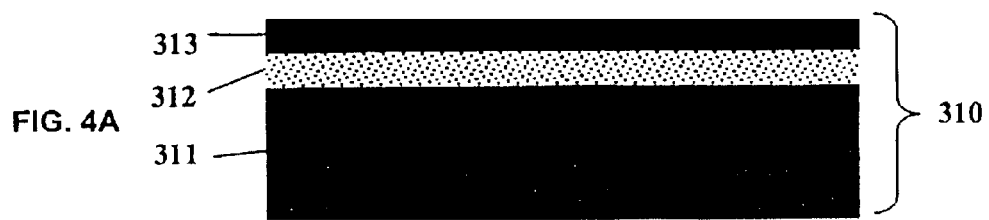
FIGS. 4A–E are cross-sectional views showing steps in a wet etching process for forming a recess in a silicon-on-insulator (SOI) substrate.
Figure 4B:
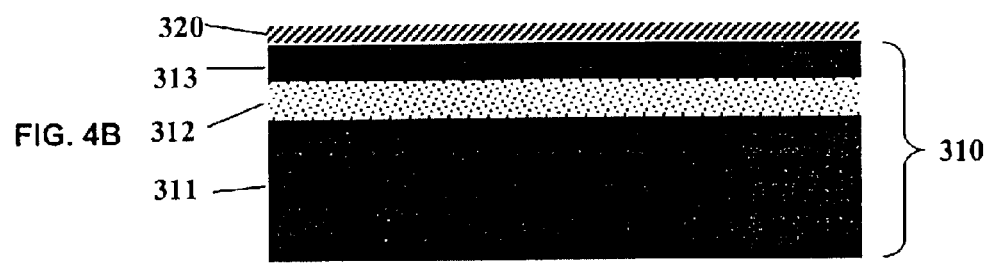
Figure 4C:
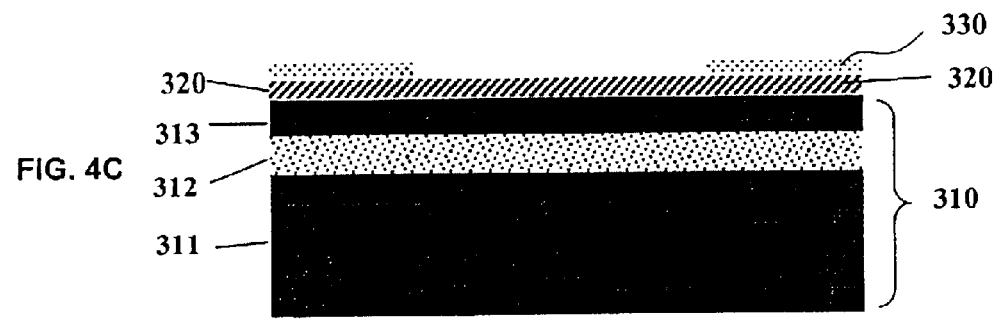
Figure 4D:
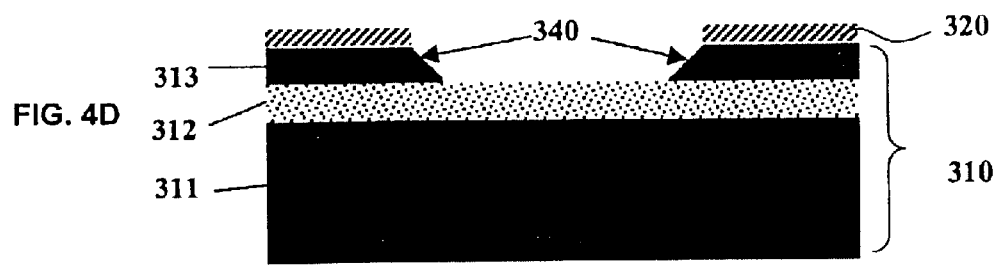
Figure 4E:
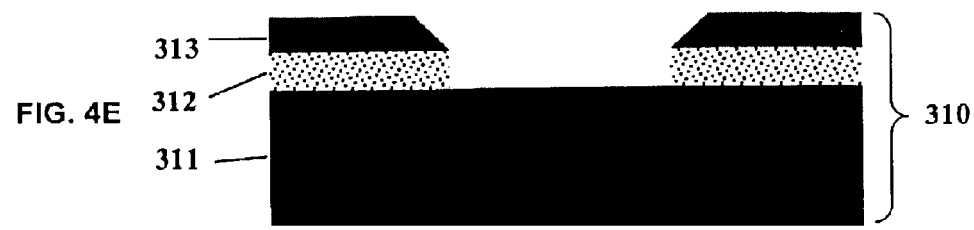

FIGS. 4A–E illustrate a wet etching process for forming a recess in a (100) SOI wafer 310. Wafer 310, shown in FIG. 4A comprises a base silicon layer 311, an insulating $SiO_2$ layer 312, and an upper silicon layer 313, in which integrated channel waveguides are to be formed. As shown in FIG. 4B, a thin (for example, 200 nm) cap layer 320 of $SiO_2$ and/or $Si_3N_4$ is deposited on the SOI wafer 310 using, e.g., chemical vapor deposition. In FIG. 4C, a photoresist pattern 330 is generated on top of cap layer 320 using standard photolithography-based processes. Reactive ion etching (RIE) is then performed to remove the part of cap layer 320 that is not protected by photoresist pattern 330. Subsequently, the remaining photoresist 330 is removed and highly selective wet etching in aqueous potassium hydroxide (KOH) solution is carried out to form the vertically inclined side walls 340 of the recess in waveguide layer 313, as shown in FIG. 4D. The remaining portion of cap pattern 320 and the part of $SiO_2$ layer 312 occupying the central portion of the recess are then etched away, as shown in FIG. 4E, using highly selective dry or wet etching that does not attack silicon.

As a result of dry etching of $SiO_2$ layer 312, the end wall of the recess may be vertical in $SiO_2$ layer 312, as shown in FIG. 4E. Adequate alignment between waveguide layer 313 and the photonic chip is provided by the inclined part of the wall in the top silicon layer. In one preferred embodiment, pillars are also formed in the recess; they can be fabricated during etching of the recess by using a suitably patterned photoresist. If desired, they can be shortened after fabrication by a further etching process in which the side walls of the recess are protected. After formation of the recess, conducting paths and/or pads may be fabricated on the floor of the recess, as described above. It will be appreciated that other materials and etchants may be used in the above-described method.

Figure 5A:
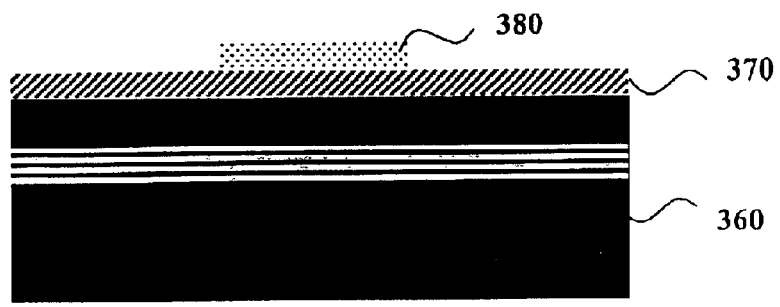
FIGS. 5A–E are cross-sectional views showing steps in a wet etching process for forming inclined end faces on a photonic chip.
Figure 5B:
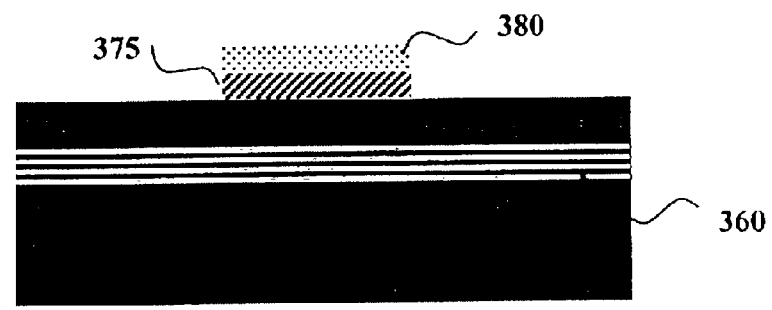
Figure 5C:
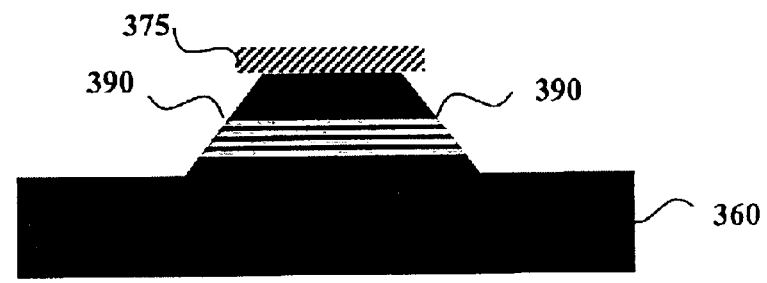
Figure 5D:
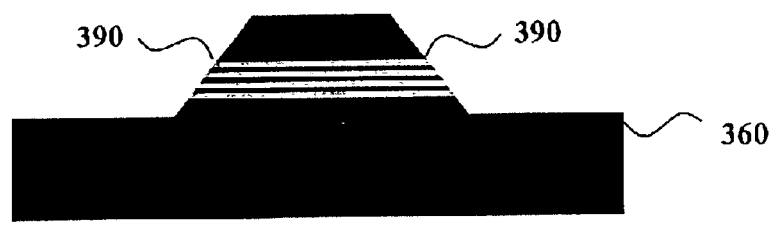

A similar process for wet etching of an InP-based photonic chip 360 is shown in FIGS. 5A–D. First, as shown in FIG. 5A, a thin (for example 100 nm) titanium cap layer 370 is applied to photonic chip 360, using, e.g., e-beam evaporation. A photoresist pattern 380 is then generated on top of cap layer 370 using standard photolithography-based processes. Wet etching is then performed to remove the part of cap layer 370 that is not protected by photoresist pattern 380, thereby forming a patterned cap 375, shown in FIG. 5B. After removing the remaining photoresist 380, highly selective wet etching in diluted HBr is carried out to form vertically inclined side faces 390 for photonic chip 360, as shown in FIG. 5C. Indentations are preferably made together with the inclined side faces, by modifying the photoresist pattern to provide additional exposed areas. Cap layer 375 is removed before photonic chip 360 is mounted into a recess. Again, it will be apparent that other materials may be used for the cap layer and other etchants selected.

Figure 5E:
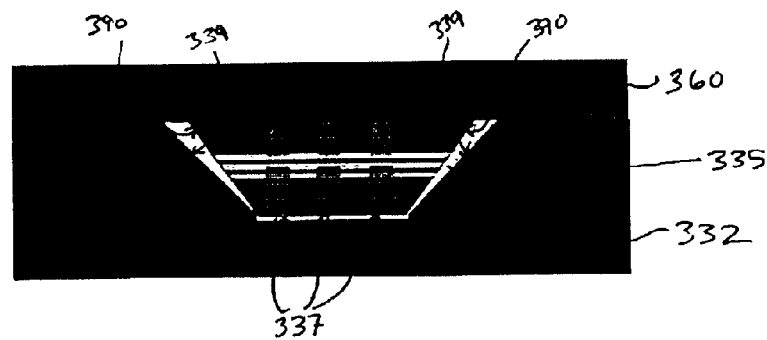

As noted above, the side face inclination angle for wet-etched Inp (32.5°) and GaAs (35°) is slightly smaller than that for silicon (35.25°). Therefore, when wet etching is used, the walls of a silicon-based recess have a slightly wider opening angle than the end faces of an InP-based photonic chip, allowing the recess to accommodate the photonic chip although the match between the end walls of the recess and end faces of the photonic chip is not perfect. FIG. 5E shows an example of wet-etched photonic chip 360 mounted in a recess wet-etched in a silicon substrate 332. Alignment is achieved using pillars and indentations 337. A small (about 1 μm) gap 335 remains between photonic chip end face 390 and recess end face 339. For many applications, gap 335 does not lead to unacceptable light loss.

Where a more exact match between the end faces is desired, a combination of wet and dry etching may be used to create the vertically inclined side faces. For example, the photonic chip may be wet etched while the recess is dry etched to match the inclination angle of the photonic chip. In embodiments where the substrate comprises a glass waveguide layer (e.g., SOS wafer substrates), dry etching is preferred because glass is an amorphous material rather than a crystal.

For proper vertical alignment of the photonic chip with the waveguide, the depth of the recess must be controlled. In one preferred embodiment, the process for fabricating a mounting recess provides flexible control over the depth of the recess so that the process may be used with a broad range of photonic chips having different vertical dimensions. Two methods for flexibly controlling the depth of a recess according to the present invention will now be described. It will be appreciated that these are examples and that other processes may be employed.

One preferred process employs a silicon-on-insulator (SOI) wafer in which the depth of the insulating $SiO_2$ layer is different at different locations in the wafer. Such a wafer can be fabricated using a modified Separation by IMplanted Oxygen (SIMOX) process in which the depth of the implanted insulating layer is controlled, as will now be described.

As is known in the art, SIMOX-based SOI wafers are made by implanting oxygen ions into a silicon wafer, then thermally annealing the wafer to convert the oxygen-ion-implanted region into $SiO_2$. In this process, the depth of the buried $SiO_2$ layer (which determines the thickness of the top silicon layer) is determined by the ion energy, while the thickness of the buried $SiO_2$ layer is determined by the range of ion energies used, to create a thicker $SiO_2$ layer, multiple implantations may be performed, each with a different ion energy. After implantation and annealing, the thickness of the top silicon layer may optionally be increased by epitaxially growing silicon upwards. Existing SIMOX processes result in the buried $SiO_2$ layer and the top silicon layer each having essentially a uniform thickness.

Figure 6A:
FIGS. 6A–F are cross-sectional views showing steps in fabrication of a recess using a modified SIMOX process.

According to the present invention, the depth of a recess in an SOI wafer may be controlled using a modified SIMOX process, which will now be described. FIG. 6A shows a silicon wafer 445 on which a patterned implantation retardation mask 410, made of, e.g., $SiO_2$, has been deposited using plasma-enhanced chemical vapor deposition or other suitable deposition techniques, e.g., thermal oxidation. Retardation mask 410 is patterned by means of conventional photolithography or related patterning technologies.

Figure 6B:
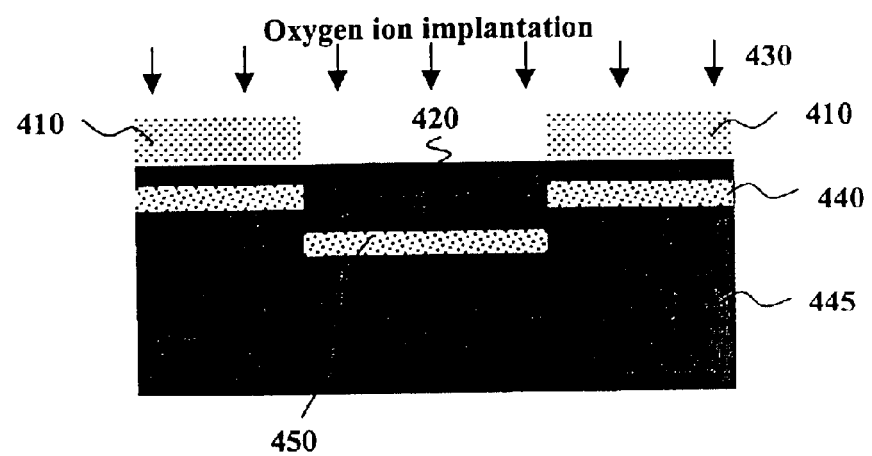

As shown in FIG. 6B, oxygen ion implantation (indicated by arrows 430) is then carried out to create buried $SiO_2$ layers 440, 450. The thickness of retardation mask 410 controls the depth to which the ions will penetrate into silicon wafer 445. As ions pass through retardation mask 410, they are slowed and thus enter wafer 445 with less energy than ions that have not passed through retardation mask 410. Consequently, in the region of mask 410, ions do not penetrate as far as where mask 410 is absent. Thus implanted $SiO_2$ layer 450 (where there is no retardation mask) is at a lower depth than implanted $SiO_2$ layer 440. As is well known in the art, multiple oxygen ion implantation steps using different ion energies may be used to increase the thickness of implanted $SiO_2$ layers 440, 450.

Figure 6C:
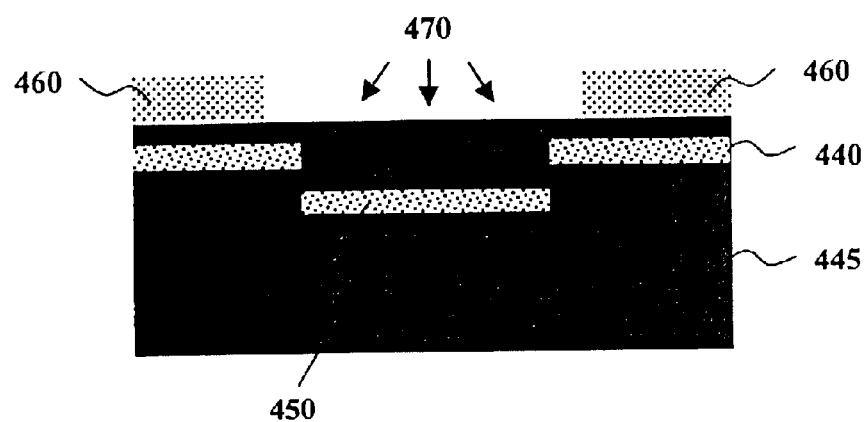
Figure 6D:
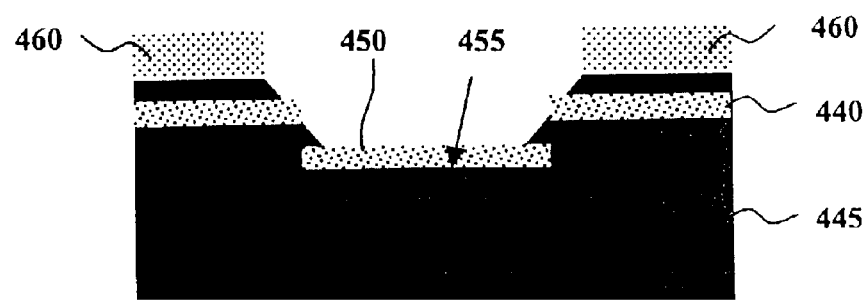
Figure 6E:
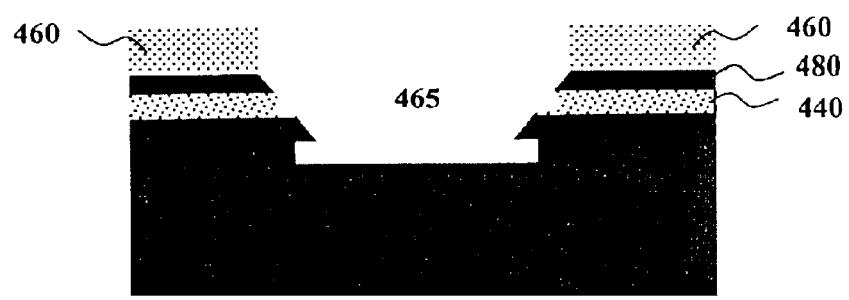

Next, as shown in FIG. 6C, wet etching mask 460 is created, either by removing part of retardation mask 410 or by completely removing retardation mask 410 and forming a new wet etching mask 460. The silicon region above the deeper buried $SiO_2$ layer 450 is then etched using highly selective wet etching for silicon (indicated by arrows 470), resulting in the configuration of FIG. 6D. This step is followed by either dry or wet etching of $SiO_2$ to remove the protruding edges of upper buried $SiO_2$ layer 440 along with lower $SiO_2$ layer 450, as shown in FIG. 6E. The $SiO_2$/Si interface 455 (indicated in FIG. 6D) provides a natural etch stop; thus, because the modified SIMOX process controls the depth of interface 455, the depth of recess 465 is controlled.

Figure 6F:
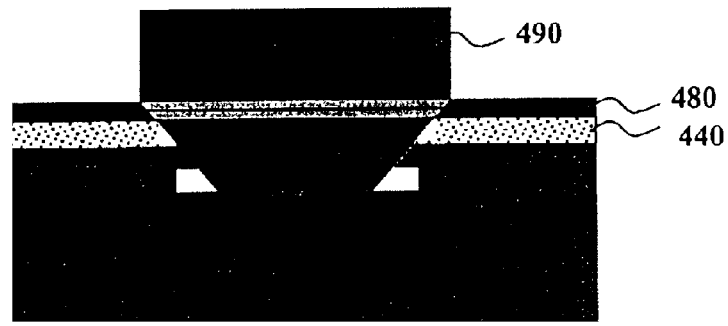

Silicon layer 480 above the shallower buried $SiO_2$ layer 440 may be made into small-dimension silicon channel waveguides to form the small-beam-size side of a beam-size transformer as described in the above-cross-referenced co-pending application entitled "Integrated Planar Composite Coupling Structures for Bi-directional Light Beam Transformation between a Small Mode Size Waveguide and a Large Mode Size Waveguide." Alternatively, other waveguides may be formed in layer 480. Finally, a photonic chip 490 with inclined end faces is mounted in recess 465, as shown in FIG. 6F.

Figure 7A:
FIGS. 7A–C are cross-sectional views illustrating control of recess depth in a SOI substrate.

In a further embodiment, the depth of the recess may also be controlled by using as a substrate either an SOI wafer made through wafer bonding or an SOS wafer made through thermal oxidation. FIG. 7A shows an SOI wafer 500 comprising bottom silicon layer 505, insulating layer 510, and top silicon layer 520. As is well known in the art, smart cutting technology combined with wafer bonding processes allow precise control of the thickness of both insulating layer 510 and top silicon layer 520.

Figure 7B:
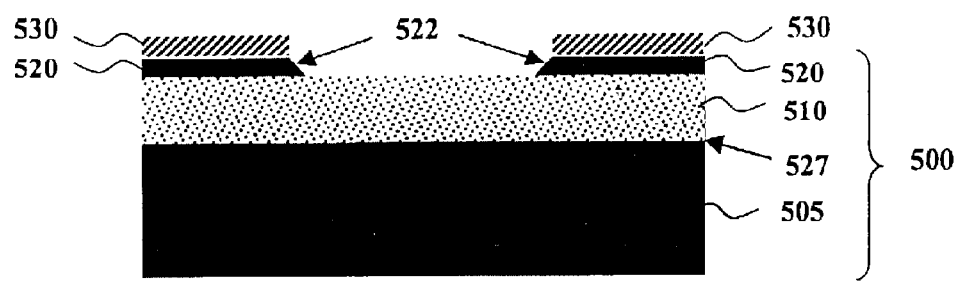
Figure 7C:
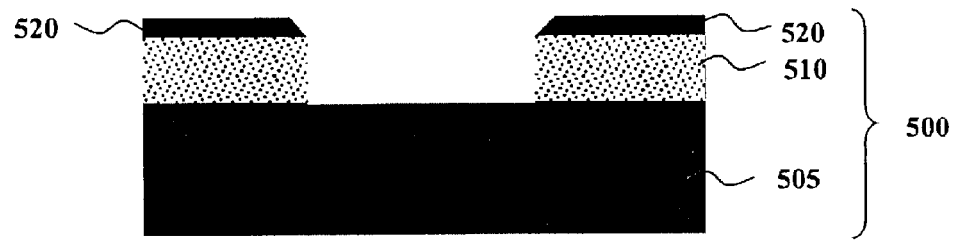

Etching cap pattern 530, shown in FIG. 7B, is created using photolithography-related processes such as metal deposition and lift off, and wet etching is carried out to create vertically inclined end walls 522 for top silicon layer 520. After the removal of cap pattern 530, dry etching of $SiO_2$ is performed, which provides a natural stop at an $SiO_2$/Si interface 527. The result is shown in FIG. 7C. A section of the recess end wall is vertical, but as discussed above with reference to FIG. 4E, adequate alignment and docking is still provided by inclined end faces 522 and preferably the fabrication of pillars (not shown). Because the thickness of top silicon layer 520 and insulating layer 510 may be precisely controlled during wafer fabrication, flexible control over the depth of the recess is provided.

Figure 8A:
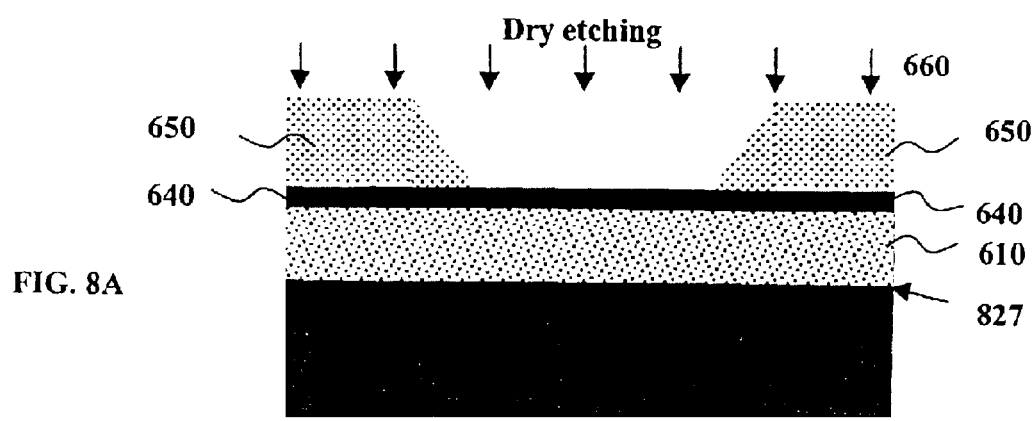
FIGS. 8A–B are cross-sectional views illustrating control of recess depth in a silica-on-silicon (SOS) substrate.
Figure 8B:
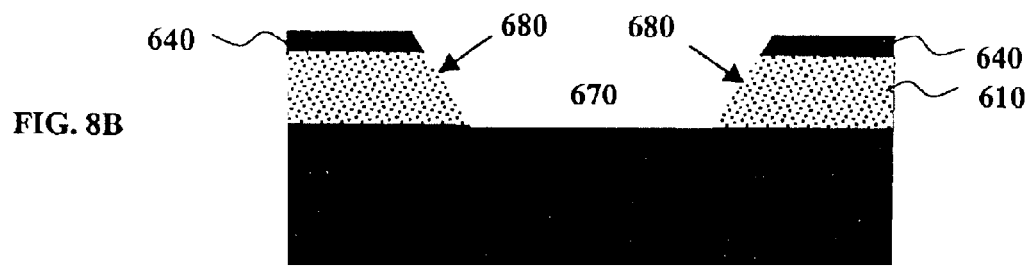

FIG. 8 illustrates control of the recess depth in an SOS wafer. FIG. 8A shows an SOS wafer having a top glass waveguide layer 640 over $SiO_2$ layer 610. As is well-known in the art, such wafers can be made through thermal oxidation, followed by deposition of the waveguide layer 640, which provides good control over the thickness of top layer 640 and $SiO_2$ layer 610. A grayscale-mask-created photoresist pattern 650 is formed on the wafer, and dry etching 660 is employed to create the inclined side walls 680 of the recess 670. The details are similar to those described above with regard to FIG. 2, with the $SiO_2$/Si interface 827 serving as a natural etch stop. Again, because the thickness of top glass waveguide layer 640 and $SiO_2$ layer 610 may be precisely controlled during wafer fabrication, enhanced control over the depth of the recess is provided.

One skilled in the art will recognize that modifications and variations of the above-described exemplary embodiments are possible. For instance, although the exemplary embodiments employ a silicon substrate, other suitable materials may be used, for instance InP, GaAs, $LiNbO_3$ and $BaTiO_3$. In addition, the representative dimensions provided herein are exemplary and may be varied. Likewise, while integrated beam-size-transformation couplers have been used as exemplary integrated waveguides, the present invention may be used with any other type of integrated channel waveguide or other optical device, including waveguide-based lasers, amplifiers, modulators, or photodetectors. One skilled in the art will also recognize that the processes described herein for forming recesses of controlled depth and pillars in substrates, as well as for forming angled end faces and indentations on photonic chips, do not exhaust the possibilities; any suitable technique may be substituted. In addition, while the present invention has been described for use with multiport photonic devices coupled to an array of integrated optical waveguides, it may also be used with single-port devices and single integrated optical waveguides.

Thus, although the present invention has been described with reference to specific embodiments, it will be appreciated that the present invention is intended to cover all modifications and equivalents within the scope of the appended claims.

What is claimed is:

1. A device for mounting and aligning a photonic integrated circuit with one or more integrated optical waveguides, comprising:

a substrate having one or more integrated optical waveguides disposed thereon;

a photonic integrated circuit having at least one end face with an inclination angle with respect to a vertical direction; and a recess formed in the substrate, the recess having a width, a depth, a substantially flat bottom surface, and at least one end wall with an inclination angle with respect to a vertical direction substantially equal to the inclination angle of the at least one end face, wherein the width of the recess is selected so that mounting of the photonic integrated circuit in the recess laterally aligns the photonic integrated circuit with the one or more integrated optical waveguides, and wherein the depth of the recess is selected so that mounting of the photonic integrated circuit in the recess vertically aligns the photonic integrated circuit with the one or more integrated waveguides.

2. The device of claim 1, further comprising:

a plurality of pillars formed on the floor of the recess, each of the pillars having inclined side faces; and a plurality of indentations formed in the bottom surface of the photonic integrated circuit, each of the indentations having inclined side walls;

wherein each of the plurality of pillars is positioned and shaped to correspond to a different one of the plurality of indentations, thereby providing alignment for the photonic chip in the recess.

3. The device of claim 1, wherein the substrate comprises a silicon-on-insulator wafer.

4. The device of claim 1, wherein the substrate comprises a silica-on-silicon wafer.

5. A method for mounting a photonic integrated circuit in alignment with one or more integrated optical waveguides disposed on a substrate, the method comprising:

shaping at least one end face of the photonic integrated circuit to have an inclination angle with respect to a vertical direction;

forming a recess in the substrate, the recess having a depth, a width, a substantially flat bottom surface, and at least one end wall having an inclination angle with respect to the vertical direction approximately equal to the inclination angle of the at least one end face of the photonic circuit;

controlling the depth of the recess during the step of forming a recess so that mounting of the photonic integrated circuit in the recess vertically aligns the photonic integrated circuit with the one or more integrated optical waveguides;

controlling the width of the recess during the step of forming a recess so that mounting of the photonic integrated circuit in the recess laterally aligns the photonic integrated circuit with the one or more integrated optical waveguides; and mounting the photonic integrated circuit in the recess so that each of the plurality of end faces of the photonic chip aligns with a corresponding one of the plurality of end walls of the recess, thereby aligning the photonic integrated circuit with the one or more integrated optical waveguides.

6. The method of claim 5, wherein the step of forming the recess comprises:

applying a photoresist layer to the substrate;

applying a grayscale mask pattern over the photoresist layer, the grayscale mask pattern configured to produce a recess with an inclined end wall;

performing photolithography to produce a photoresist pattern that is vertically tapered in a region corresponding to the desired location of the inclined end wall; and performing dry etching to transfer the vertically tapered photoresist pattern to the substrate, thereby producing the inclined end wall.

7. The method of claim 5, wherein:

the photonic integrated circuit comprises a crystalline semiconductor material; and the step of shaping at least one end face of the photonic integrated circuit comprises wet etching the crystalline semiconductor material.

8. The method of claim 5, wherein the substrate comprises a crystalline semiconductor material; and the step of forming a recess in the substrate comprises wet etching the crystalline semiconductor material.

9. The method of claim 5, further comprising:

forming a plurality of pillars on the bottom surface of the recess, each of said plurality of pillars having inclined end faces;

forming a plurality of indentations on a mounting surface of the photonic integrated circuit, each of said plurality of indentations being positioned and shaped to correspond to one of the plurality of pillars; and during mounting of the photonic integrated circuit in the recess, aligning each of the plurality of pillars with the corresponding one of the plurality of indentations.

10. The method of claim 5, wherein the substrate comprises a silicon wafer and the step of controlling the depth of the recess comprises:

depositing a patterned retardation mask layer on the wafer, the patterned retardation mask layer including a gap in a first region of the wafer at a location where the recess is to be formed;

implanting oxygen ions through the patterned retardation mask layer so that the implanted oxygen ions penetrate to approximately a first depth in the region of the wafer where the recess is to be formed and to approximately a second depth less deep than the first depth in a second region of the wafer away from the location where the recess is to be formed, the first depth being selected to define a recess depth;

thermally annealing the substrate to create a first partial insulating silicon dioxide layer at approximately the first depth and a second partial insulating silicon dioxide layer at approximately the second depth; and etching the wafer using the first partial insulating silicon dioxide layer as a natural etch stop to form a bottom surface of the recess.

11. The method of claim 5, wherein the step of controlling the depth of the recess comprises the steps of:

selecting as the substrate a silicon-on-insulator (SOI) wafer wherein an insulating layer of the SOI wafer has a first selected thickness and a top silicon layer of the SOI wafer has a second selected thickness, a sum of the first selected thickness and the second selected thickness being substantially equal to a desired depth of the recess; and etching the SOI wafer using an interface between the insulating layer and a bottom silicon layer of the SOI wafer as a natural etch stop.

12. The method of claim 5, wherein the step of controlling the depth of the recess during formation comprises the steps of:

selecting as the substrate a silica-on-silicon (SOS) wafer wherein an insulating layer of the SOS wafer has a first selected thickness and a top silica layer of the SOS wafer has a second selected thickness, a sum of the first selected thickness and the second selected thickness being substantially equal to a desired depth of the recess; and etching the SOS wafer using an interface between the insulating layer and a bottom silicon layer of the SOS wafer as a natural etch stop.

* * * * *